A. O. TATE.
WINDSHIELD FOR VEHICLES.
APPLICATION FILED MAR. 13, 1920.
1,388,214.
Patented Aug. 23, 1921.
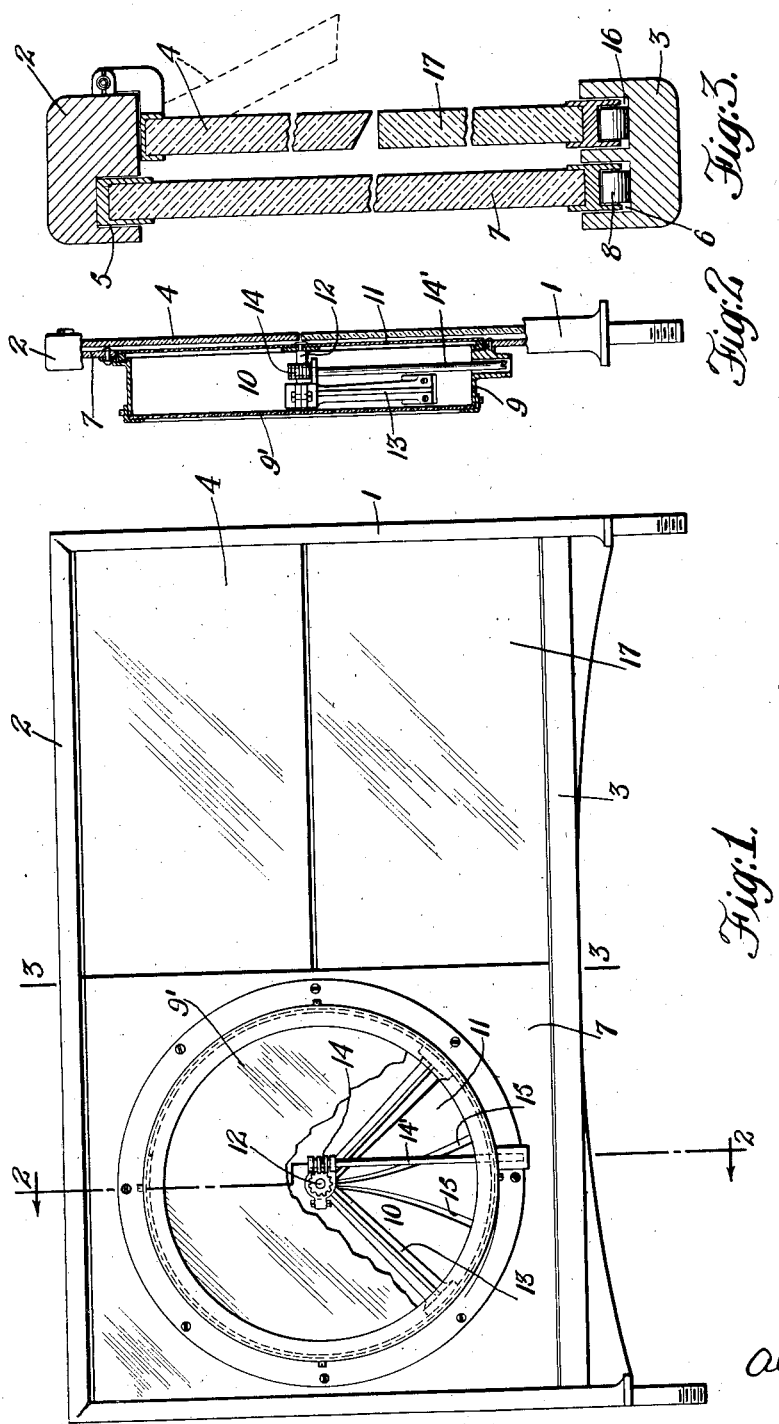
Inventor
Alfred O. Tate
By Sheffield & Betts
Attorneys

UNITED STATES PATENT OFFICE.

ALFRED O. TATE, OF NEW YORK, N. Y.

WINDSHIELD FOR VEHICLES.

1,388,214.      Specification of Letters Patent.      Patented Aug. 23, 1921.

Application filed March 13, 1920. Serial No. 365,482.

*To all whom it may concern:*

Be it known that I, ALFRED O. TATE, a subject of the King of Great Britain, and a resident of the borough of Manhattan, city, county, and State of New York, have invented certain new and useful Improvements in Windshields for Vehicles, of which the following is a description.

My invention relates to the art of improving vision under adverse conditions and has to do principally with the application of my prior invention disclosed in Serial No. 317,484, filed August 14, 1919, to automobile vehicles.

The principal object of my invention is to provide a windshield device which the driver of an automobile may readily adjust to meet adverse visual conditions or ordinary conditions as desired.

The novel features of my invention are pointed out with particularity in the appended claims. The invention itself, however, with further objects and advantages may best be understood by reference to the following description taken with the accompanying drawing, in which:

Figure 1 is an elevation of a windshield for automobiles according to my invention, as it appears from the driver's seat, part being broken away for purposes of illustration;

Fig. 2 is a section taken on the line 2—2 of Fig. 1 looking in the direction of the arrows, parts being shown in elevation; and Fig. 3 is a sectional view on an enlarged scale, parts being broken away, taken on the line 3—3 of Fig. 1, after the lower pane has been shifted to the position indicated in Fig. 1 in dotted lines.

In the drawing, 1 is a frame which may be similar to those commonly used for automobile windshields, although preferably of broader cross section so that it may better accommodate all the parts which I prefer to use. The frame 1 comprises in addition to uprights at the side, two horizontal members 2 and 3 at top and bottom, respectively. Frame 1 preferably has pivoted thereto in the usual manner, an adjustable shield member or pane 4 which extends the entire length of the frame 1, this direction being transverse to the vehicle body when the windshield is in use. The horizontal members 2 and 3, according to my invention, have trackways therein preferably extending the full length of members 2 and 3 and numbered 5 and 6 respectively, in which is guided a plate 7. Plate 7 is mounted to slide in the trackways and it is preferably mounted on rollers such as 8 so that it may be easily moved. Mounted on plate 7 is a case 9 which projects rearwardly from frame 1 toward the driver's seat when the device is in use. Within case 9 is a visualizer or lookout device 10 preferably of the type described by me in my prior application, Serial No. 317,484. Although my present invention does not relate to an improvement in the visualizer *per se*, I have described the visualizer 10 hereinbelow in some detail to facilitate understanding the drawing. This device comprises a disk, such as 11, which is fixed to shaft 12, the latter being mounted for rotation in case 9 in a bearing provided by brackets, such as 13. The case 9 is covered at the rear by a hinged glass plate 9'. The disk 11 is rotated when in use by any suitable means connected to spindle 14, this spindle being geared to shaft 12, as indicated at 14. Disk 11 has slots, such as 15, therein which may be of any desired or preferred form or arrangement, so far as the purposes of this invention are concerned. However, I have obtained the best results to date when using slots 15 formed as illustrated in Fig. 1, this form of visualizer being disclosed in my prior application Serial No. 353902, filed Jan. 24, 1920. It will be seen that the driver can readily move the visualizer 10 over in his line of vision or move it away from in front of him according as visual conditions indicate that the device should be used or not, such devices being of great assistance under conditions of rain or unusual glare on the roadway.

It will be seen from the drawing that the pivoted shield member 4 is shown in Fig. 1 as extending the full length of the frame 1 in the usual manner. As pane or member 4 lies in front of the plane of trackways 5 and 6, member 4 can be raised and lowered without regard to the position of case 9. In case of rain, it is desirable to raise member 4 sufficiently so that the line of vision shall be below it.

In order to keep the wind from blowing through the frame in the space not covered by pane 4 and visualizer 10, I provide another trackway 16 in cross member 3 and in trackway 16 I mount a vertical pane or shield member 17, the latter lying in the same vertical plane as shutter member 4 when the shutter is lowered to its fullest extent. When the driver has pushed the visualizer to one side of the line of vision, he may move pane 17 over in front of him, whereupon the windshield device functions in the same manner as the common form.

It will be seen that a windshield device according to my invention is readily adjustable to conform to all conditions met with in service. The pivoted shield member 4, slidable shield member 17, and visualizer 10 may be moved out of the direct line of vision, but still be arranged so that the driver will be partially shielded from the wind and so that he may look through the visualizer or lookout device at will; the shield members 4 and 17 may be placed so that the driver is fully protected from wind from the front; the glass shield members may be moved entirely out of the way and the visualizer employed alone; the visualizer as well as the shield members 4 and 17 may be moved entirely from in front of the driver's seat; or any combination of these arrangements may be made as desired.

What I claim is:

1. The combination with the frame of a windshield of a lookout device mounted in said frame to move transversely of the vehicle from one end of the frame to the other, and a glass pane mounted to move in said frame parallel to the movement of said device and an equal distance, whereby the positions of said pane and device may be interchanged with relation to the driver.

2. The combination with the frame of a windshield of a lookout device mounted in said frame to move transversely of the vehicle from one end of the frame to the other, a glass pane mounted to move in said frame parallel to the movement of said device and an equal distance, whereby the positions of said pane and device may be interchanged with relation to the driver, and a pane pivoted near the upper edge of said frame.

3. A windshield for vehicles comprising a frame, a transparent pane pivoted to said frame near its upper end, and extending only part way downwardly of said frame, a transparent pane mounted to move transversely of said frame and substantially in the vertical plane including said first mentioned pane when the latter hangs vertically downward, a visualizer comprising a casing and a plate secured to said visualizer, said plate mounted to move transversely of said frame and in a plane behind said transversely movable pane, said plate extending the full height of said frame and said second mentioned pane lying below said first mentioned pane, said plate and said second mentioned pane overlapping when moved in opposite directions to the limits of their movements in said frame.

ALFRED O. TATE.